Aug. 11, 1936.   R. J. OLANDER   2,050,541
FRICTION SHOCK ABSORBING MECHANISM
Filed April 15, 1935
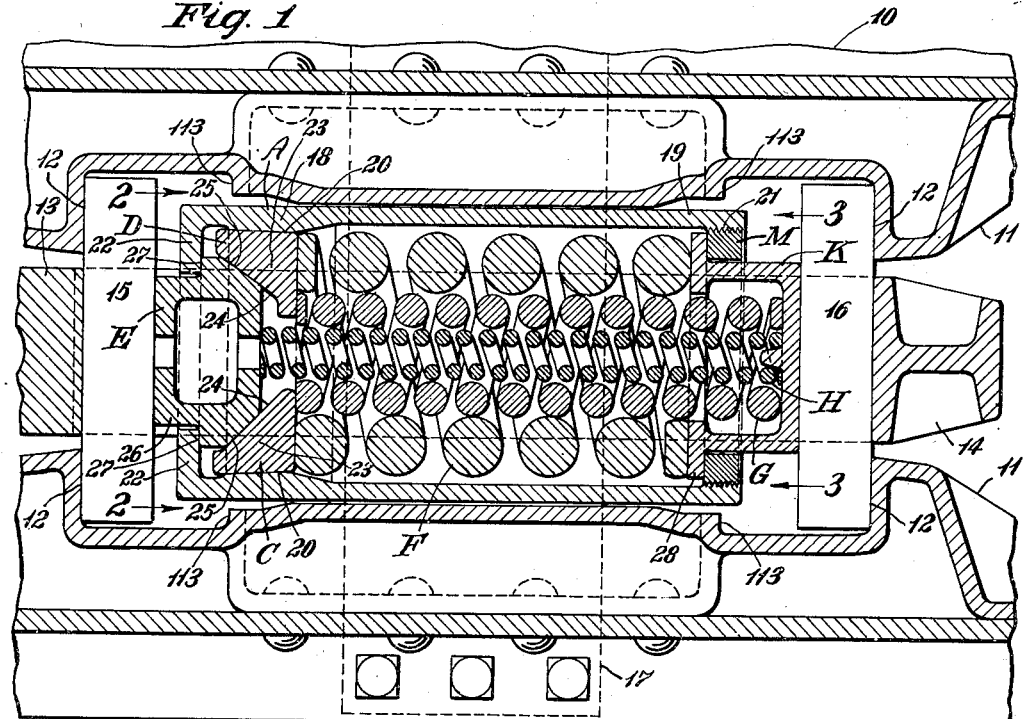
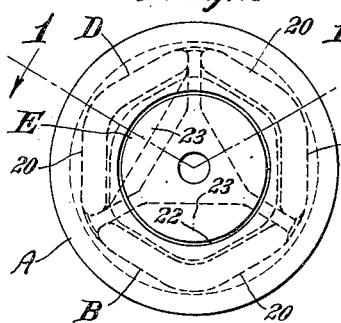
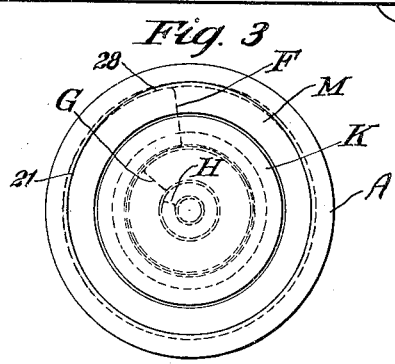
Inventor
Roland J. Olander
By Henry Fuchs
Atty.

Patented Aug. 11, 1936

2,050,541

UNITED STATES PATENT OFFICE 2,050,541

FRICTION SHOCK ABSORBING MECHANISM

Roland J. Olander, Chicago, Ill., assignor to W. H. Miner, Inc., Chicago, Ill., a corporation of Delaware Application April 15, 1935, Serial No. 16,445

10 Claims. (Cl. 213—24)

This invention relates to improvements in friction shock absorbing mechanisms especially adapted for draft riggings of railway cars.

One object of the invention is to provide a friction shock absorbing mechanism having high preliminary free spring action followed by relatively heavy frictional resistance, thereby particularly adapting the mechanism for passenger car service.

Another object of the invention is to provide a friction shock absorbing mechanism comprising a friction shell having spring resisted friction means cooperating therewith, including a wedge member and friction shoes, wherein the friction means and springs are assembled within the shell by insertion through the rear end of the latter, retaining means being provided at the rear end of the shell for holding the parts assembled.

A further object of the invention is to provide in a mechanism of the character indicated, preliminary spring action by means of a movable spring cap at the rear end of the shell which cooperates with the spring means of the mechanism, the cap being held in assembled relation with the other parts by the retaining means, which is adjustable to place the springs under the required amount of initial compression and maintain the mechanism of predetermined overall length.

A more specific object of the invention is to provide in a mechanism of the character hereinbefore set forth adjustable retaining means in the form of a ring fitted into the open rear end of the shell and having shouldered engagement with the spring cap, together with shoulders at the front end of the shell cooperating with the wedge to limit outward movement of the same, whereby all of the parts of the mechanism may be inserted through the rear end of the shell, thus eliminating the use of the usual adjustable retainer bolt employed in friction shock absorbing mechanisms of this general type, and permitting the use of a shock absorbing spring of maximum size and capacity.

Other objects of the invention will more clearly appear from the description and claims hereinafter following.

In the drawing forming a part of this specification, Figure 1 is a longitudinal sectional view through the underframe structure of a railway car, illustrating my improvements in connection therewith, the section through the friction shell being on two intersecting planes disposed at an angle of 120 degrees with respect to each other, the section corresponding substantially to the line I—I of Figure 2. Figure 2 is a front elevational view of the shock absorbing mechanism shown in Figure 1, and Figure 3 is a rear elevational view of said shock absorbing mechanism.

In said drawing 10—10 indicates channel shaped center draft sills of a railway car underframe structure, to the inner sides of which are secured stop castings 11—11, having front and rear main stop shoulders 12—12 and front and rear intermediate limiting stop shoulders 113—113. The inner end of the coupler shank is indicated by 13, and a yoke 14 of well-known form is connected thereto. My improved shock absorbing mechanism, a main front follower 15 and a main rear follower 16 are disposed within the yoke, and the yoke is supported by a saddle plate 17 secured to the lower flanges of the draft sills 10—10.

My improved shock absorbing mechanism comprises broadly a combined friction shell and spring cage A; three friction shoes B, C, and D; a wedge E; spring resistance means comprising coils F, G, and H; a spring cap K; and a combined retaining and adjusting ring M.

The combined friction shell and spring cage A is in the form of a substantially cylindrical casing having the friction shell section proper 18 formed at the forward end thereof, and the spring cage section 19 rearwardly of said shell section. The friction shell or casing A is of substantially cylindrical, exterior cross section, as clearly shown in Figures 2 and 3. The friction shell section 18 is of substantially hexagonal, interior cross section and has three inwardly converging substantially V-shaped friction surfaces 20—20—20. At the rear end, the shell or casing A is open, as indicated at 21, said opening being interiorly threaded to receive the retaining ring M. At the forward end, the casing A has a laterally, inwardly projecting, substantially annular flange 22 which partly overhangs the wedge and forms combined retaining stop means for the same, as hereinafter pointed out. As shown in Figure 1, said flange 22 is spaced slightly forwardly of the front ends of the interior friction surfaces 20—20—20 of the friction shell.

The friction shoes B, C, and D are of substantially the same design, with the exception that the shoe D has the wedge face thereof, which cooperates with the wedge block E, disposed at a keener angle with respect to the longitudinal axis of the mechanism than the corresponding wedge faces of the other shoes. The wedge face of each shoe is formed on an inward enlargement 23 of the shoe, said wedge face being indicated by 24.

The wedge block E has three inwardly converging wedge faces 25—25—25, which engage respectively with the wedge faces 24—24—24 of the shoes. At the forward end, the wedge has a cylindrical projection 26 which extends through the opening defined by the annular flange 22 of the casing A and bears on the front follower 15. At the inner end of said cylindrical portion 26, the wedge presents a substantially annular abutment shoulder 27, which engages the flange 22 to limit outward movement of the wedge.

The retaining ring M is provided with exterior screw threads and is threaded into the rear end of the casing A, as clearly shown in Figures 1 and 3, and serves as a stop shoulder for the cap K.

The cap K is in the form of a hollow thimble having a laterally outwardly extending, annular retaining flange 28 at the inner end thereof in shouldered engagement with the ring M. As shown in Figure 1, the outer end of the cap K normally bears on the rear follower 16.

The springs F, G, and H are arranged within the casing, the spring F, which is relatively heavy, surrounding the relatively lighter spring G, and the still lighter spring H which is disposed within the spring G. The springs G and H have their rear ends extending into the cap K and bearing on the outer end wall of said cap, while the rear end of the spring F bears on the flange 28 of said cap. The springs F and G bear at their forward ends on the flat inner end faces of the friction shoes, and the spring H extends between said shoes and has its forward end bearing on the flat inner end face of the wedge E.

In assembling my improved shock absorbing mechanism, the wedge E, the friction shoes B, C, and D, together with the three springs F, G, and H and the spring cap K in position at the rear end of the springs, are inserted through the open rear end of the friction shell or casing A. The mechanism is then slightly compressed and the ring M is threaded into the rear end of the casing, thereby holding the parts assembled. As clearly shown in Figure 1, when the parts are completely assembled, the retaining ring M is spaced slightly inwardly of the rear end of the shell A so that when the mechanism is compressed against the rear follower 16 the ring will be relieved of the load when the shell engages said follower 16. Upon reference to Figure 1, it will be observed that the spring F is of relatively large diameter and of the maximum size that can be accommodated within the casing A. In fact, the diameter of the spring F is such that it could not be assembled within the casing by inserting the same between the friction surfaces of the shell 18. By arranging for insertion of the spring from the rear end of the casing, this spring of relatively large diameter is adapted for use in the friction gear which would otherwise accommodate only a spring of much smaller exterior diameter. It is further pointed out that adjustment of the parts is provided by the screw threaded retaining ring M. By properly adjusting the ring M within the casing A, the springs F, G, and H are placed under the required initial compression and the maximum overall length of the gear is maintained at all times.

In the operation of my improved friction shock absorbing mechanism, upon movement of the followers 15 and 16 toward each other, the mechanism will be compressed between said followers. During the first part of the compression, the spring cap K is moved inwardly with respect to the friction shell A, thereby compressing the springs F, G, and H. During this action, there is no movement of the friction shoes with respect to the friction shell A due to the high frictional resistance between the shoes and shell faces. During the further compression of the mechanism, the rear end of the friction shell A will be brought into engagement with the rear follower 16, thereby arresting relative movement of the spring follower cap and friction casing A. During the further compression of the mechanism, the friction shoes will be forced to move inwardly of the friction shell against the resistance of the springs F, G, and H, thereby providing the necessary high shock absorbing capacity required at this stage of the operation. Movement of the friction shoes inwardly of the friction shell is limited by engagement of the front follower 15 with the forward end of the shell, whereupon the shell acts as a solid column to transmit the load from the follower 15 to the follower 16. When the actuating force is reduced, the spring H, which directly bears on the inner end of the wedge E, assists in the releasing action of the wedge. The expansive action of the springs F, G, and H restores the spring cap K and the friction shoes B, C, and D, together with the wedge E, to the normal fully released position shown in Figure 1.

I have herein shown and described what I now consider the preferred manner of carrying out my invention, but the same is merely illustrative and I contemplate all changes and modifications that come within the scope of the claims appended hereto.

I claim:

1. In a friction shock absorbing mechanism, the combination with a friction shell; of a movable spring follower projecting from one end of the shell, said spring follower being movable inwardly and outwardly of said shell; friction means cooperating with the other end of the shell, said friction means having parts thereof providing a follower engaging surface; springs within the shell interposed between said spring follower and friction means opposing relative movement of said spring follower, friction means and shell; a shouldered stop member on said first named end of the shell having shouldered engagement with the spring follower for limiting outward movement of the latter, said stop member being adjustably mounted on the shell for varying the position of said stop member lengthwise of the shell for determining the limit of outward projection of said spring follower thereby determining the overall length of the mechanism from the follower engaging surface of the friction means to the outer end of said spring follower.

2. In a friction shock absorbing mechanism, the combination with a friction shell; of a shouldered spring follower projecting from one end of the shell, said spring follower being movable inwardly and outwardly of said shell; friction means cooperating with the other end of the shell and having a main follower engaging portion; spring resistance means within the shell opposing relative movement of the spring follower, friction means and shell; and means having shouldered engagement with said spring follower cap for limiting outward movement of the spring follower cap, said means having a threaded connection with the shell to provide adjustment lengthwise thereof with respect to the shell to determine the extent of outward projection of said spring follower, to thereby determine the overall length of the mechanism from the outer end of said spring follower to the main follower engaging portion of the friction means.

3. In a friction shock absorbing mechanism, the combination with a friction shell; of a spring follower cap projecting from one end of the shell, said spring follower cap being movable inwardly and outwardly of the shell; friction means cooperating with the shell at the other end thereof, said friction means being provided with a main follower engaging face; spring resistance means within the shell, yieldingly opposing relative movement of the spring follower cap, friction means and shell; and a stop ring at the first named end of the shell, said stop ring having shouldered engagement with the cap to limit outward movement of the latter, said stop ring being connected to the shell for adjustment lengthwise of the shell to determine the limit of outward projection of said spring follower cap thereby determining the overall length of the mechanism from said follower engaging face of the friction means to the outer end of said spring follower.

4. In a friction shock absorbing mechanism, the combination with a friction shell; of a shouldered spring follower cap projecting from one end of the shell, said spring follower cap being movable inwardly and outwardly of the shell; friction means cooperating with the shell at the other end thereof, said friction means including a member adapted to transmit the actuating force; stop means on the shell limiting outward projection of said member with respect to the shell; spring resistance means within the shell, yieldingly opposing relative movement of the spring follower cap, friction means, and shell; and a stop ring secured within the first named end of the shell and telescoped over said cap, said stop ring having shouldered engagement with the shouldered portion of said cap to limit outward movement of the latter, said stop ring having screw threaded adjustment within the shell lengthwise of the mechanism to determine the limit of outward projection of said spring follower cap and thereby determine the overall length of the mechanism from the outer end of said member to the outer end of said spring follower cap.

5. In a friction shock absorbing mechanism, the combination with a friction shell having interior friction surfaces at one end thereof and being open at the other end, said open end being interiorly threaded; of an adjustable stop ring threaded into said open end; friction means cooperating with the friction surfaces of the shell, said friction means including a movable pressure transmitting member at said first named end of the shell; fixed stop means on the shell having shouldered engagement with said member for fixing the amount of outward movement of said pressure transmitting member; a spring follower cap projecting through said stop ring and outwardly beyond the end of the shell, said spring follower cap having an annular stop flange at the inner end thereof overhanging said ring and having shouldered engagement therewith to limit outward movement of said cap; and spring resistance means within the shell yieldingly opposing relative movement of the friction means, spring cap, and shell, said stop ring being adjustable lengthwise of the shell to determine the limit of projection of said spring follower from the shell, thereby determining the overall length of the mechanism from the outer end of said pressure transmitting member to the outer end of said spring follower cap.

6. In a friction shock absorbing mechanism, the combination with a friction shell having interior friction surfaces at one end; an inwardly and outwardly movable spring follower at the other end of said shell; retaining means at said last named end of the shell limiting outward movement of the spring follower; friction shoes engaging the friction surfaces of the shell; a block having wedging engagement with the shoes; and spring resistance means within the shell, said spring resistance means including inner and outer coils, said outer coil bearing at opposite ends on the spring follower and friction shoes, and said inner coil bearing at opposite ends on said wedge block and spring follower.

7. In a friction shock absorbing mechanism, the combination with a casing having interior friction surfaces at one end thereof defining a friction shell section, said casing having a spring cage section inwardly of the friction shell section extending to the other end of the casing; of a stop ring threaded into said second named end of the casing; an annular inturned flange at the outer end of the friction shell section of said casing; a wedge block having a projection extending through the opening defined by said annular flange, said block having shouldered engagement with said flange to limit outward movement of the block; a plurality of friction shoes in wedging engagement with said block and in sliding frictional engagement with the friction surfaces of the shell; a spring cap extending through said ring, said cap having an annular flange in shouldered engagement with the ring to limit outward movement of said cap; and spring resistance means within the casing opposing relative movement of the spring cap and shoes and wedge.

8. In a friction shock absorbing mechanism, the combination with a friction shell open at the front and rear ends, said shell being of hexagonal, interior cross section at the front end, said hexagonal portion of the shell providing a plurality of V-shaped friction surfaces, the remainder of said shell being of cylindrical, interior cross section and providing a spring cage section; of a plurality of friction shoes having V-shaped friction surfaces cooperating with the friction surfaces of the shell; a wedge engaging the shoes, said wedge having shouldered engagement with the shell to limit outward movement of said wedge; an interior stop ring having threaded engagement within the rear end of the shell; a spring cap extending through said stop ring, said cap being movable inwardly and outwardly of the shell, and having shouldered engagement with the stop ring to limit outward movement of said cap; and spring resistance means within the spring cage section of the shell yieldingly opposing relative movement of the shoes and spring cap.

9. In a friction shock absorbing mechanism, the combination with a friction shell member; of a movable spring follower member projecting from one end of the shell member, said spring follower member being movable inwardly and outwardly of said shell member; friction means cooperating with the other end of the shell member, said friction means having part thereof providing a follower engaging surface; springs within the shell member interposed between said spring follower member and friction means opposing relative movement of said spring follower member, friction means, and shell member; and means for adjustably connecting said spring follower member and shell member comprising an element adjustable with respect to one of said members, whereby the projection of said spring follower member beyond said shell member is definitely determined to determine the overall length of the mechanism from the follower engaging surface of the friction means to the outer end of said spring follower member.

10. In a friction shock absorbing mechanism, the combination with a friction shell; of a movable spring follower projecting from one end of the shell, said spring follower being movable inwardly and outwardly of said shell; friction means cooperating with the other end of the shell having part thereof protruding a fixed distance beyond the end of the shell; springs within the shell interposed between said spring follower and friction means opposing relative movement of said spring follower, friction means, and shell; and means engaging said spring follower and shell and adjustable with reference to said shell to determine the projection of said spring follower beyond said shell and thereby determine the overall length of the mechanism from the outer end of said protruding part of the friction means to the outer end of said spring follower.

ROLAND J. OLANDER.